Figure 1:
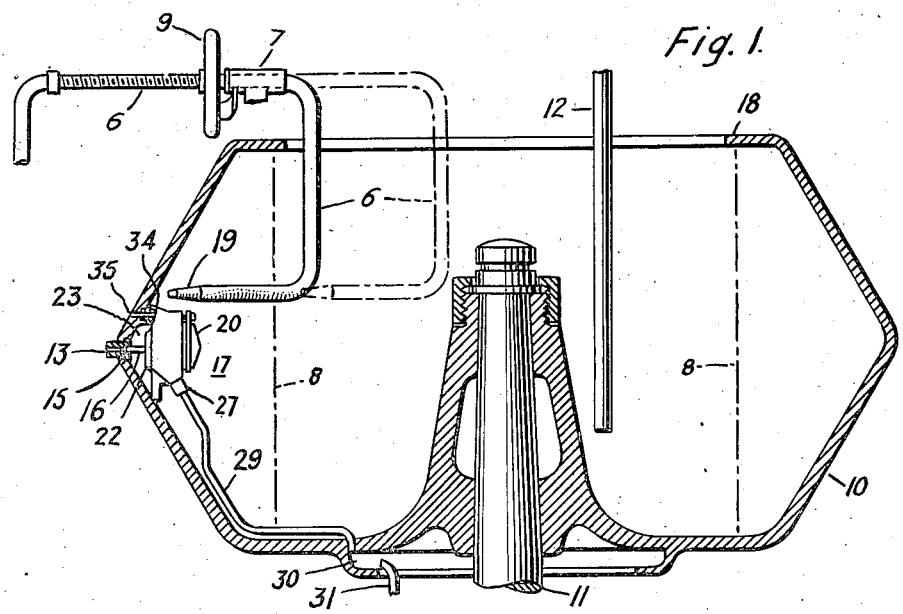

June 15, 1943.   A. U. AYRES   2,321,887
PROCESS FOR CENTRIFUGALLY SEPARATING
SOLIDS FROM LIQUIDS
Filed April 26, 1941

INVENTOR
Arthur U. Ayres
BY
Maurice A. Crews
ATTORNEY

Patented June 15, 1943

2,321,887

UNITED STATES PATENT OFFICE 2,321,887

PROCESS FOR CENTRIFUGALLY SEPARATING SOLIDS FROM LIQUIDS

Arthur U. Ayres, Chestnut Hill, Pa., assignor to The Sharples Corporation, Philadelphia, Pa., a corporation of Delaware Application April 26, 1941, Serial No. 390,508

4 Claims. (Cl. 233—20)

The present invention pertains to an improved method of separating a solid constituent from a liquid in which it is suspended. It pertains also to a centrifugal separator by which efficient separation of solids from a liquid can be accomplished in cases in which the solids are of such a flocculent character that they have caused unusual difficulty in connection with efforts to separate them by previously known centrifugal apparatus.

The invention pertains particularly to apparatus and process for separating from a continuous liquid phase a solid constituent of such a flocculent nature that it must be agglomerated before it can be removed. Separation of such a constituent may be partially accomplished by gravity, but the solids do not separate into a firm layer by gravity, and a considerable proportion of liquid is accordingly lost with the solids. As a consequence of this fact, the operator must take care not to remove this solid-contaminated liquor with the clear liquor, and the yield of clear liquor is therefore relatively poor.

Improved results as compared to gravity separation have been attained by a batch type centrifugal separator of large diameter, which has been filled with liquid and rotated for a considerable length of time, thus permitting agglomeration of solids to take place, and substituting centrifugal force for the force of gravity in separating the solids, thereby separating the solids from a larger portion of the liquid by the increased effect of centrifugal force. When this type of operation was adopted, the liquid was ordinarily removed from the sedimented solids by means of a conventional skimming nozzle mounted on a stationary bracket, while the solids were retained against the inner peripheral wall of an imperforate rotor. While a clear liquid was obtained during the early stages of the skimming operation, turbulence created by the skimming nozzle tended to stir up deposited solids as the skimming nozzle moved outwardly in skimming liquid from the portion of the rotor closer to the bed of deposited solids, with the result that the skimming operation had to be discontinued while the rotor still contained a considerable quantity of liquid, or that considerable quantities of finely divided solids were discharged with the liquid during the later stages of the skimming operation. Thus, this type of operation, while having the advantage of providing a larger body of clear liquid during the separating operation, had the attendant disadvantage that this liquid could not be removed from the centrifugal rotor without resuspending solids in at least a part of the liquid.

A second type of centrifugal separation which has been employed in attempts to solve this problem has been that of passage of the mixture of liquid and solids continuously through a centrifugal rotor provided with valves at the periphery. In this type of operation, the valves are periodically opened during the continuous operation, this opening being accomplished by some kind of timing mechanism, or automatically in response to accumulation of solids in the rotor. This type of operation had the advantage that it avoided approach of a skimming nozzle to a bed of deposited solids, but the solids were not given sufficient time to agglomerate in the rotor, and the continuous flow of liquid through the rotor also kept the solids stirred up, thereby preventing efficient sedimentation in cases in which the solids suspended in the liquid were of a flocculent nature.

Figure 2:
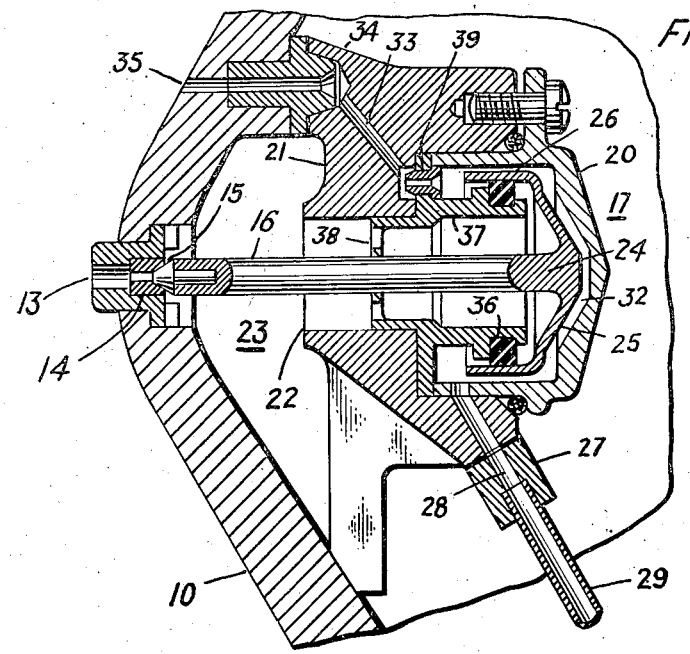

A feature of the present invention consists in the fact that it provides a method and apparatus by which the solids are given time to agglomerate in the rotor, sedimented to the circumference of the rotor under the influence of centrifugal force, removed peripherally from the rotor separately from the liquid, and that the liquid is thereafter removed from the rotor separately. The details and nature of the features of the invention by which these results are accomplished will be evident from the following detailed description as based on the attached drawing, in which, Figure 1 is a cross section of a centrifugal rotor designed for accomplishment of the operation of the invention, and Figure 2 is an enlarged detailed cross section illustrating an operating motor for actuating one of these valves used in the rotor of the invention.

While the process of the invention may be practiced with many different types of apparatus, a preliminary consideration of the apparatus of the present invention will assist us in understanding the process of the invention. Referring to the attached drawing, the apparatus of the invention consists of a rotor 10, which may be secured to a shaft 11 driven from any suitable source of power. The liquid containing suspended solids which is treated in the practice of the invention may be fed to the rotor through a feed tube 12. The peripheral wall of the rotor is provided with a plurality of restricted ports 13 (only one of which is shown) and each of these ports is associated with a valve seat 14, and a valve 15 coacting with the seat to maintain the rotor closed against discharge of solids during most of the cycle of centrifugation.

While the valves may be actuated in any suitable manner, in the form of the invention illustrated in the drawing, each valve is provided with a radially inwardly extending valve stem 16, and each of these valve stems may form a part of an individual motor 17 for opening the valve at intervals under control of the operator or in response to a predetermined accumulation of solids adjacent the valve, or in response to the operation of timer mechanism. The upper end of the centrifugal rotor is provided with an inwardly directed annular flange 18 which normally prevents discharge of liquid from the rotor except through a skimming tube 6 having a nozzle 19. This skimming tube 6 is mounted in a stationary bearing 7 for sliding movement radially with respect to the rotor, in such a manner, as by manipulation of a hand wheel 9 on a screw threaded portion of the tube, that the skimming nozzle 19 may be moved from its position, indicated by dot-and-dash lines, adjacent to the innermost zone of the rotor occupied by liquid when the rotor is fully loaded, to its outermost position, indicated by full lines, in which it is adjacent the periphery of the rotor, facing the oncoming liquid as the latter is rotated. The skimming tube is thus adapted to have the liquid forced into its nozzle and to remove practically all of the liquid from the rotor.

The manner in which the process of the invention is practiced in use of the machine can now be described. Liquid is fed to the rotor 10 through the feed tube 12 during rotation of the rotor. When the liquid has reached a desired predetermined depth, within the flange 18, as indicated by dot-and-dash lines 8, feed of liquid is discontinued, and the rotation of the rotor is continued during the necessary agglomeration of the solids and sedimentation of the solids adjacent the space occupied by the valves 15. These valves are opened, after deposit of a quantity of solids, in order to effect discharge of the solids. This opening of the valves may be accomplished in a series of successive operations in which the valves are opened a plurality of times intermittently in operating on a single body of liquid, or the control of the valves may be accomplished in such a way that they are opened only after deposit of all of the solids contained in the body of liquid under treatment. In either case, the liquid is substantially completely freed of solids, and the solids are discharged from the clarified liquid through the peripheral ports 13 during the centrifugal operation, before the liquid is discharged. Furthermore, the size of the discharge ports is such, and the opening of the valves is so controlled, that very little liquid is discharged with the solids, the major portion of the clarified liquid being retained in the rotor.

After the solids have been substantially completely removed from the rotor, the skimming nozzle 19 is moved outwardly to a point adjacent to the line 8 at which it engages the rotating body of liquid in the rotor and skims this body of liquid through the tube 6 and away from the rotor. The skimming nozzle is moved radially outwardly during the skimming operation, so that it gradually removes the entire body of clarified liquid in the rotor.

From the above discussion, it will be evident that operation in accordance with the invention effects the important advantage of removing the body of solids peripherally from the rotor before any attempt is made to remove the main body of liquid therefrom. By operating in this sequence, it is possible to avoid the turbulence caused by continuous flow of liquid through the rotor, and thus effect efficient sedimentation of the solids, and it is possible also to avoid stirring up of the solids by the action of the skimming tube and nozzle, since these solids have been removed from the rotor before the skimming nozzle is moved to a position in which it might otherwise cause them to be resuspended in the liquid.

While the invention has been described above as applied by the use of a skimming nozzle for removing the liquid, it is possible to remove the liquid by other means, so long as the fundamental sequence discussed above is employed. Thus, instead of using a skimming nozzle, it is possible in the practice of the invention to remove the the solids through the ports 13, and thereafter to remove the clarified liquid through these same ports, collecting the liquid separately from the solids.

While any desired type of mechanism may be used for actuating the valves 15 at the desired intervals, one preferred form of actuating mechanism is illustrated in Figure 2 of the drawing. Each motor 17 is provided with a housing which consists of an inner end portion 20, and an outer base portion 21, which is secured to the portion 20. This housing surrounds the moving parts of the motor. The base portion 21 has an annular extension 22 which lies adjacent the zone 23 of accumulation of solids and constitutes the entrance to a bore in the base 21 through which the valve stem 16 extends. The inner end 24 of the valve stem 16 which is the moving member of the fluid pressure motor, has a piston head portion 25, provided with a depending annular flange 26. The flange 26 surrounds a sealing member, which may be a rubber ring 36 held by a tubular member or cylinder 37 having a spider 38 through which the valve stem 16 slidably extends.

The housing base 21 is provided with a lateral extension 27, which contains a passage 28 communicating with a space 32 surrounding the moving member or piston head 25 of the fluid pressure motor. The passage 28 also communicates with a tube 29 which connects the extension 27 with a channel 30 in the lower end of the centrifugal rotor. Liquid may be passed to this channel 30 through a feed tube 31.

The space 32 surrounding the piston head 25 is also in communication, through an orifice 39 connecting this space with a bore 33 in an extension 34 of the base portion 21 of the motor housing, with an outlet 35 in the rotor wall, through which fluid for actuating the motor is discharged from the machine. It will be noted that liquid is discharged through the outlet 35 separately from the solids discharged through the port 13, and the liquid from outlet 35 may be collected separately from the solids.

In the operation of the machine to control the valves by the motors discussed above, liquid is fed through the tube 31 and into the tube 29 before the main body of liquid containing solids is fed into the rotor for treatment. The feed of this auxiliary liquid into the rotor during the rotation thereof, at a greater rate than this liquid can be discharged through the outlet 35 from the motor, causes accumulation of liquid in the space 32 and tube 29, thereby causing the piston head 25 and valve stem 16 to move outwardly and move the valve 15 to closed position. The feed of auxiliary liquid into the tube 29 to maintain a head of liquid in this tube for holding the valves in closed position is continued during the centrifugal treatment of liquid containing solids in the rotor, until it is desired to discharge the solids through the ports 13. The feed of liquid through the tube 31 is then discontinued, and liquid is allowed to recede outwardly in the tube 29 to a point at which the pressure of liquid acting through the extension 22 against the outer or valve side of the piston 25 overcomes the hydrosatic head from the tube 29 on the inner side of this piston, thereby effecting opening of the valve 15. The port 13 is thus maintained open until the solids are discharged from the rotor, and the feed of liquid through the tube 31 may then be resumed as desired to cause the valves to return to closed position.

Modifications will be obvious to those skilled in the art, and I do not therefore wish to be limited except by the scope of the following claims.

I claim:

1. In the separation of solids from liquids, the process comprising, feeding a mixture consisting of a liquid containing suspended solids to a centrifugal rotor, subjecting said mixture to centrifugation to effect sedimentation of said solids by rotating said rotor, while retaining said liquid within the rotor, removing sedimented solids circumferentially from said rotor while retaining said liquid in the rotor, and thereafter separately removing the clarified liquid from the rotor.

2. In the separation of solids from liquids, the process comprising, feeding a mixture consisting of a liquid containing suspended solids to a centrifugal rotor, subjecting said mixture to centrifugation to effect sedimentation of said solids by rotating said rotor, while retaining said liquid within the rotor, removing sedimented solids circumferentially from said rotor while retaining said liquid in the rotor, and thereafter separately skimming the clarified liquid from the rotor.

3. In the separation of solids from liquids, the process comprising, feeding a mixture consisting of a liquid containing suspended solids to a centrifugal rotor, subjecting said mixture to centrifugation to effect sedimentation of said solids by rotating said rotor, while retaining said liquid within the rotor, removing sedimented solids circumferentially from said rotor through valves while retaining said liquid in the rotor, and thereafter separately removing the clarified liquid from the rotor.

4. In the separation of solids from liquids, the process comprising, feeding a mixture consisting of a liquid containing suspended solids to a centrifugal rotor while rotating said rotor, subjecting said mixture to centrifugation to effect sedimentation of said solids by rotating said rotor, while retaining said liquid within the rotor, removing sedimented solids circumferentially from said rotor while retaining said liquid in the rotor, and thereafter separately removing the clarified liquid from the rotor.

ARTHUR U. AYRES.